Jan. 19, 1965   R. T. BURNETT ETAL   3,166,156
CALIPER-TYPE DISC BRAKE
Filed Nov. 21, 1960   10 Sheets-Sheet 7
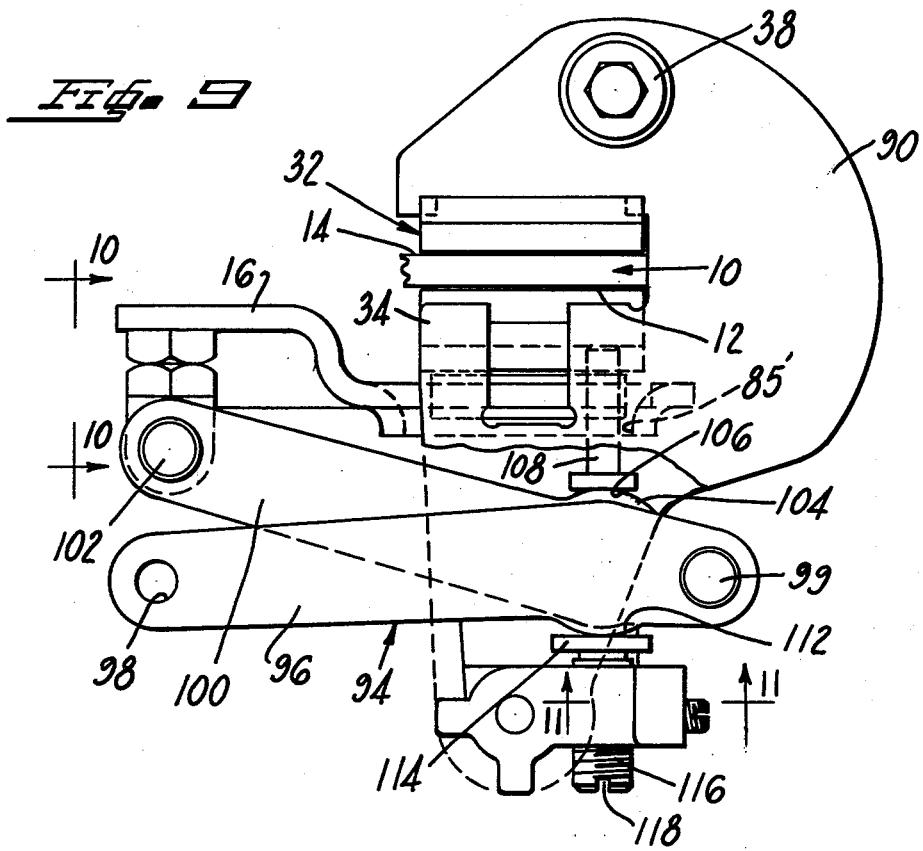
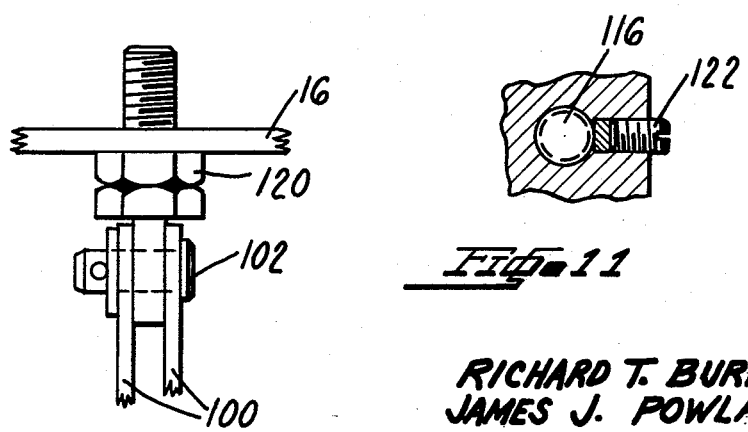
RICHARD T. BURNETT
JAMES J. POWLAS
INVENTORS
BY John A. Young
ATTORNEY

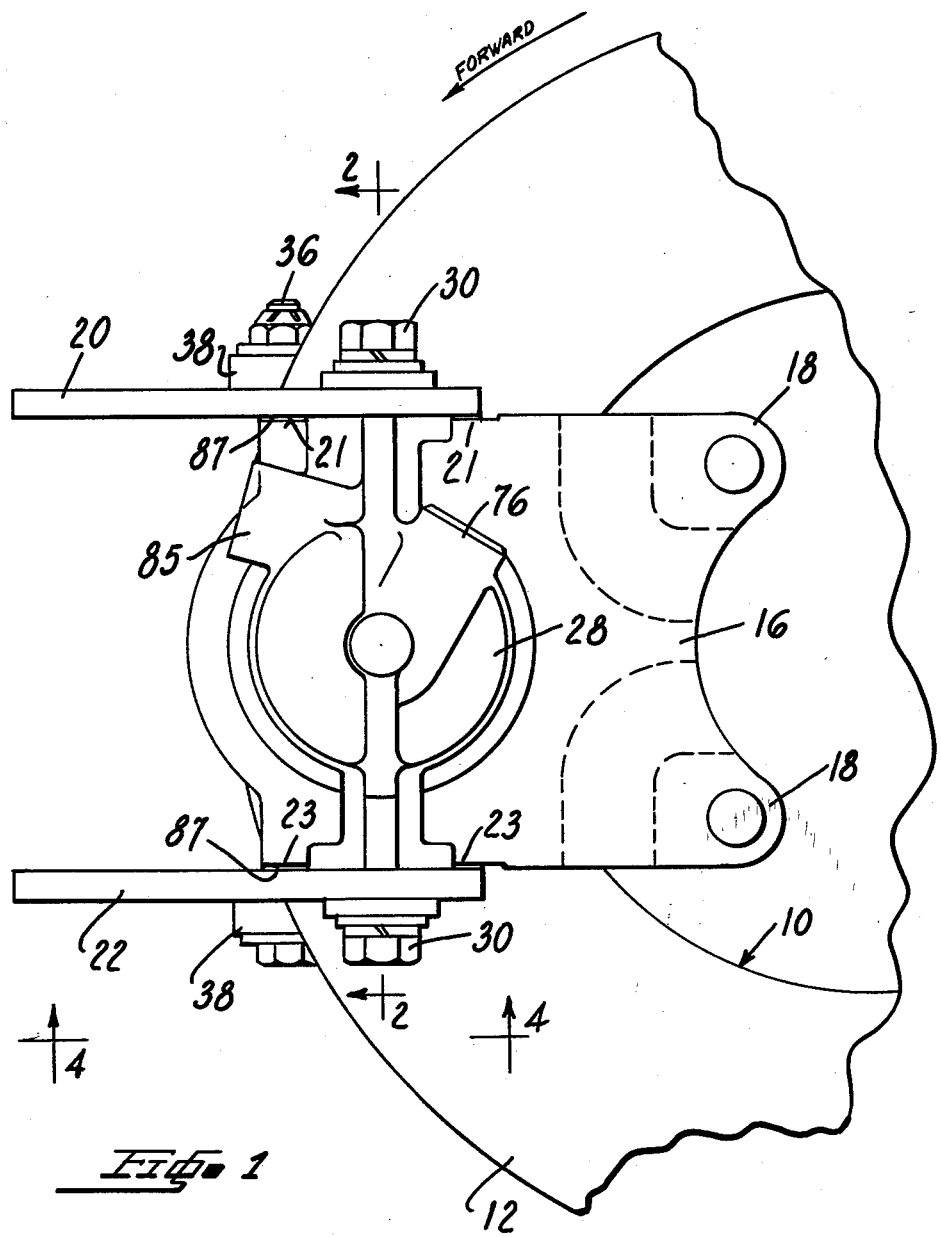

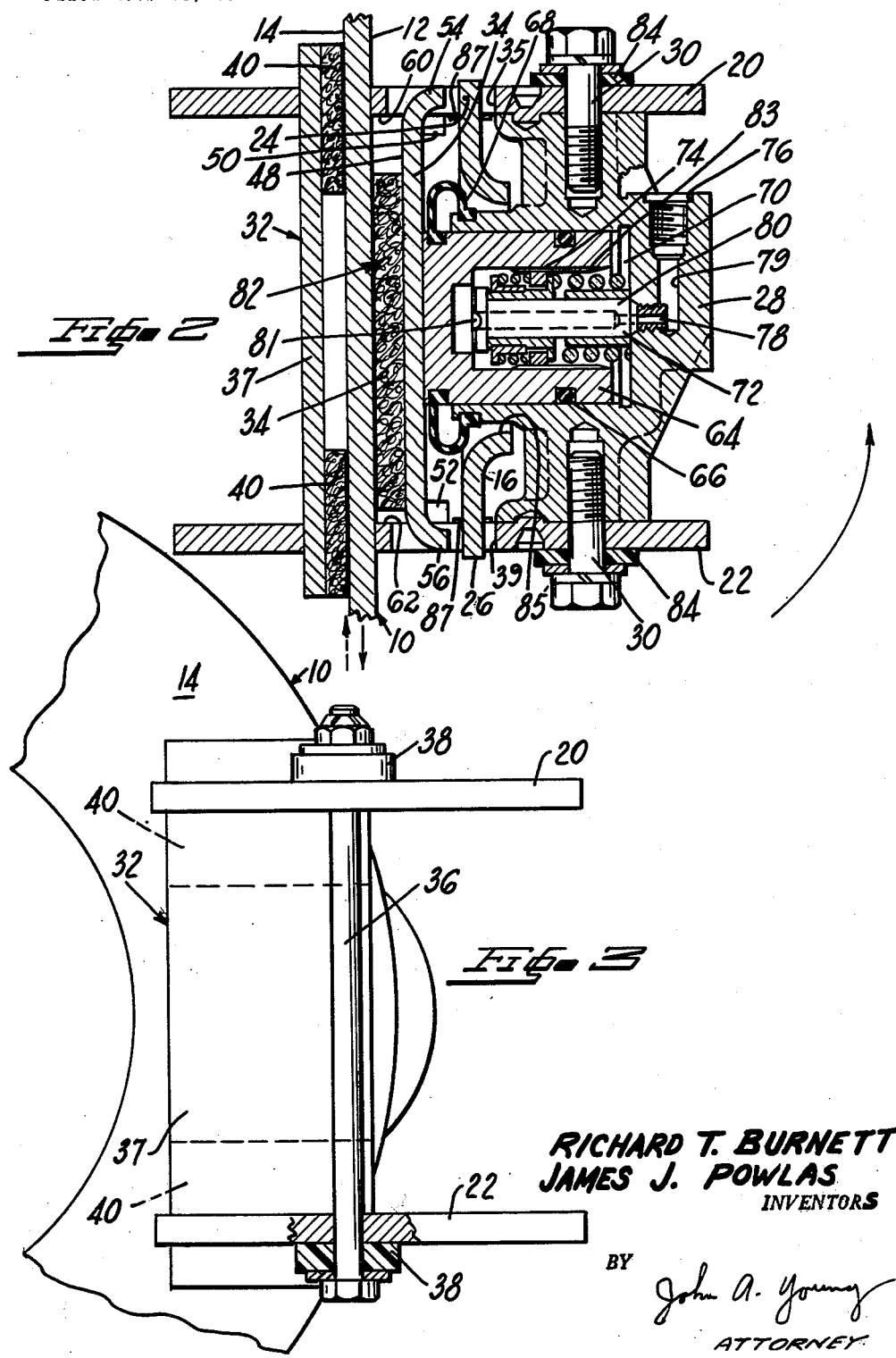

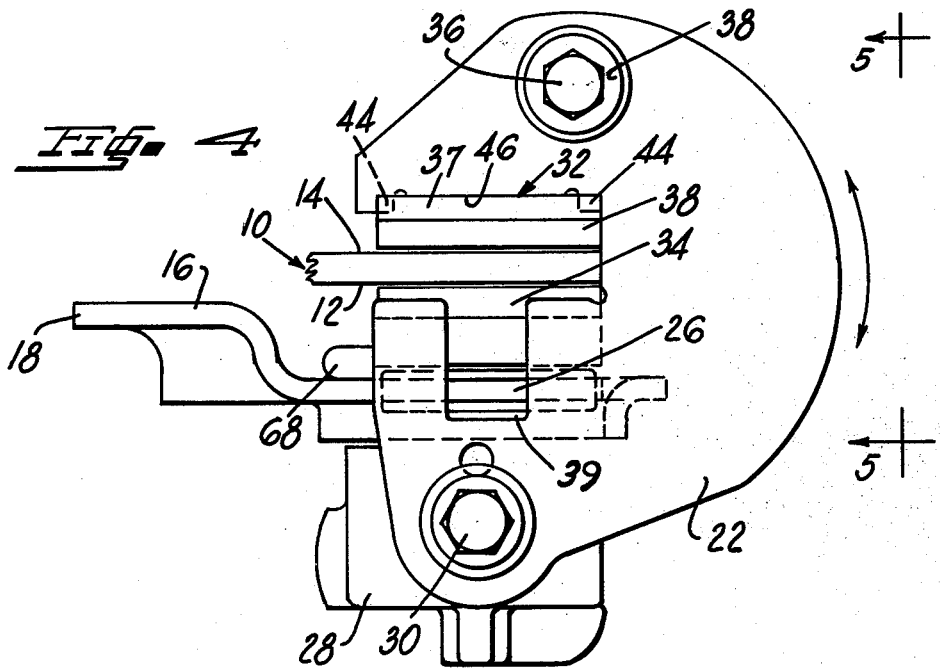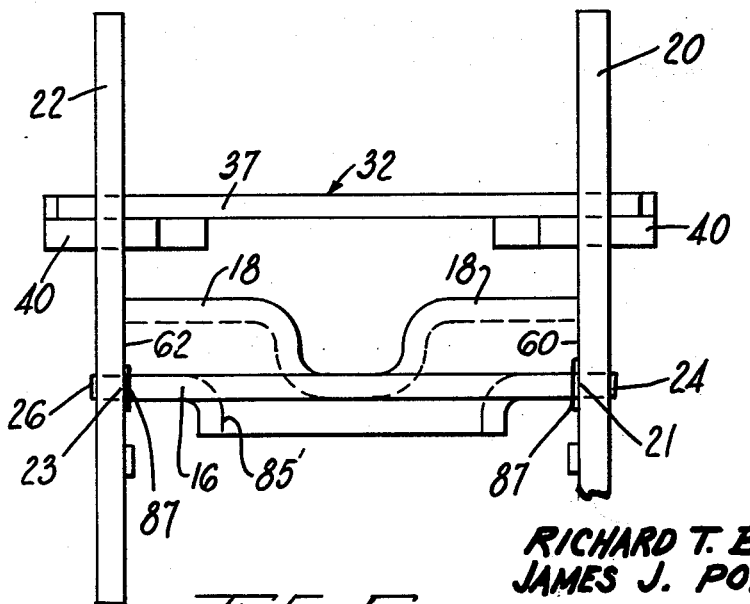

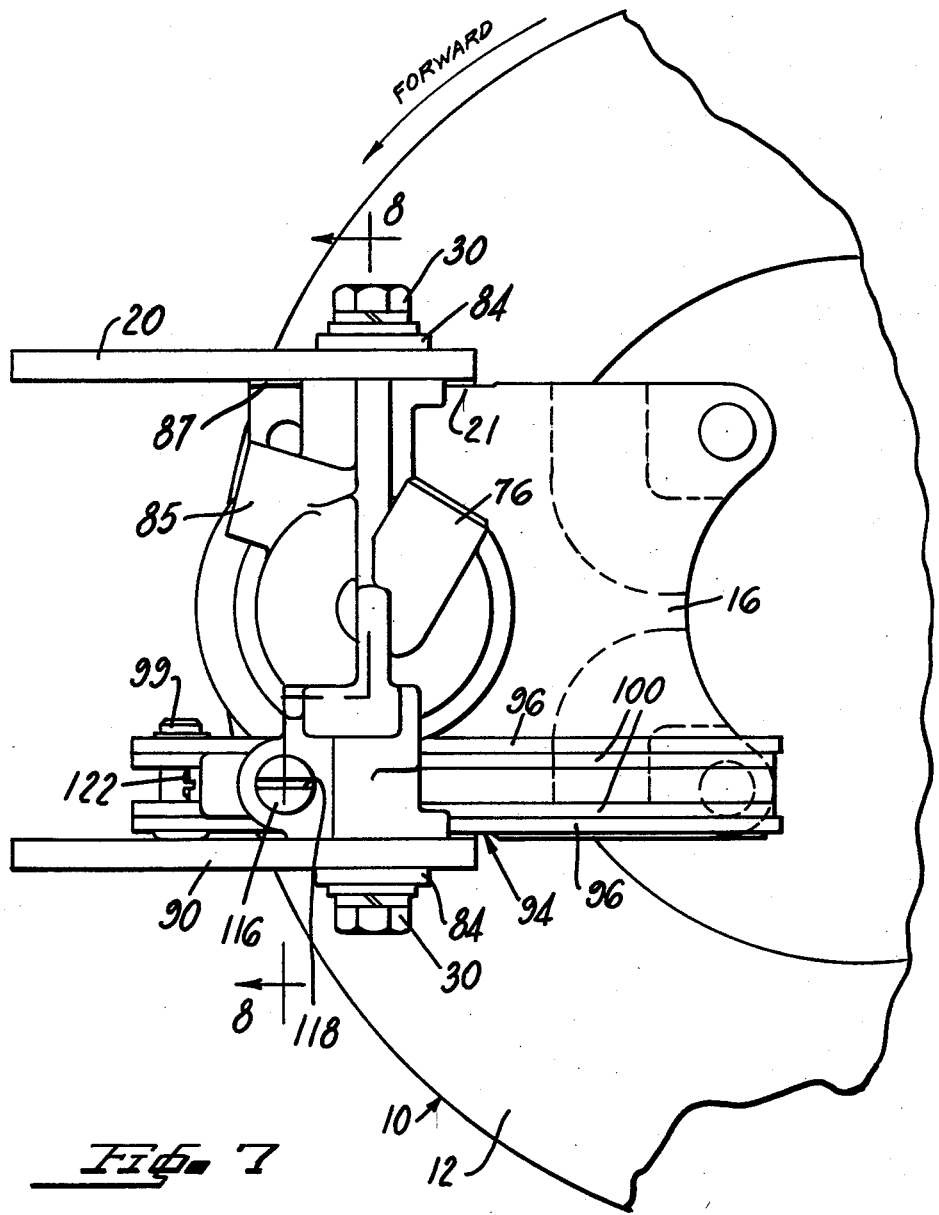

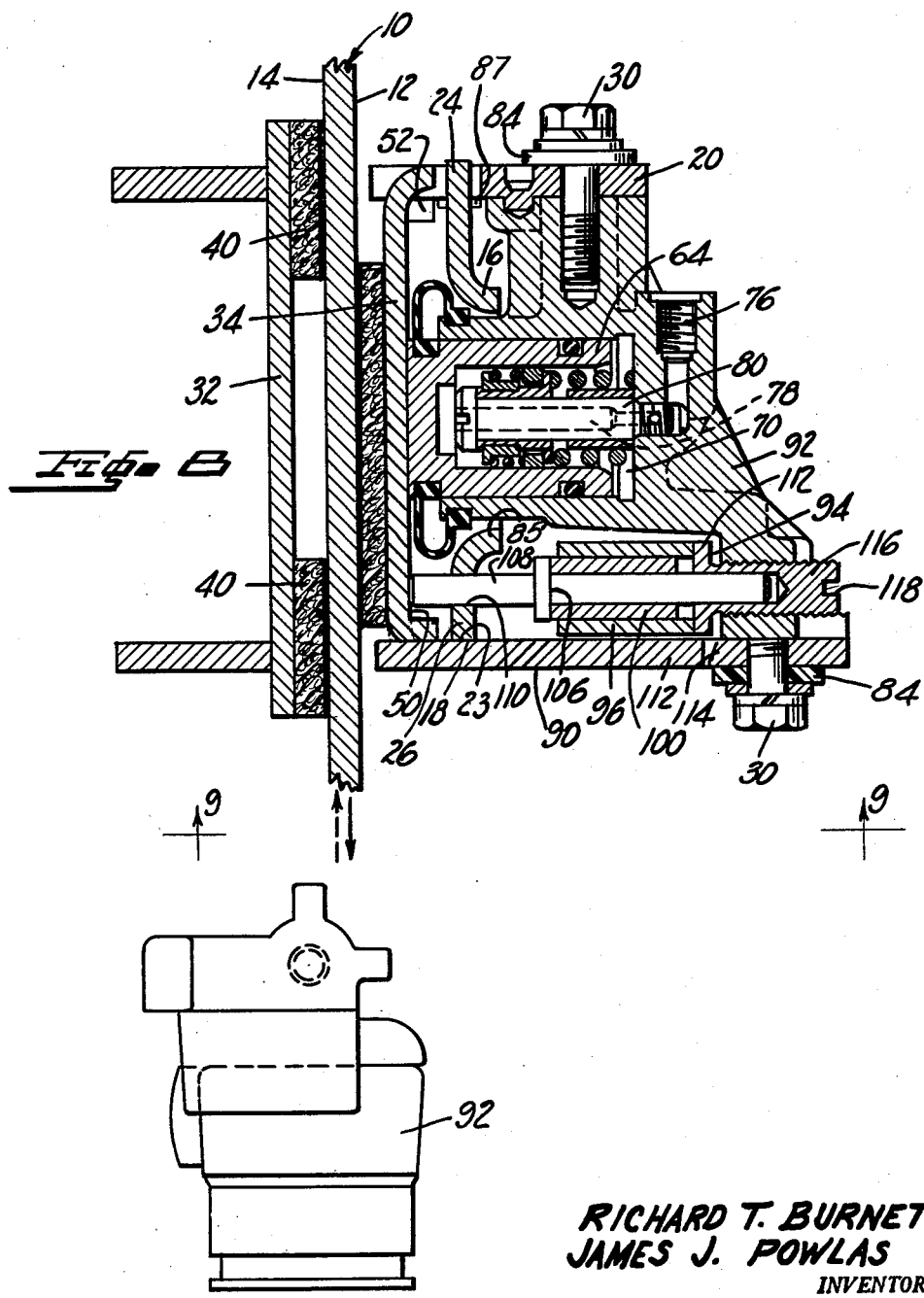

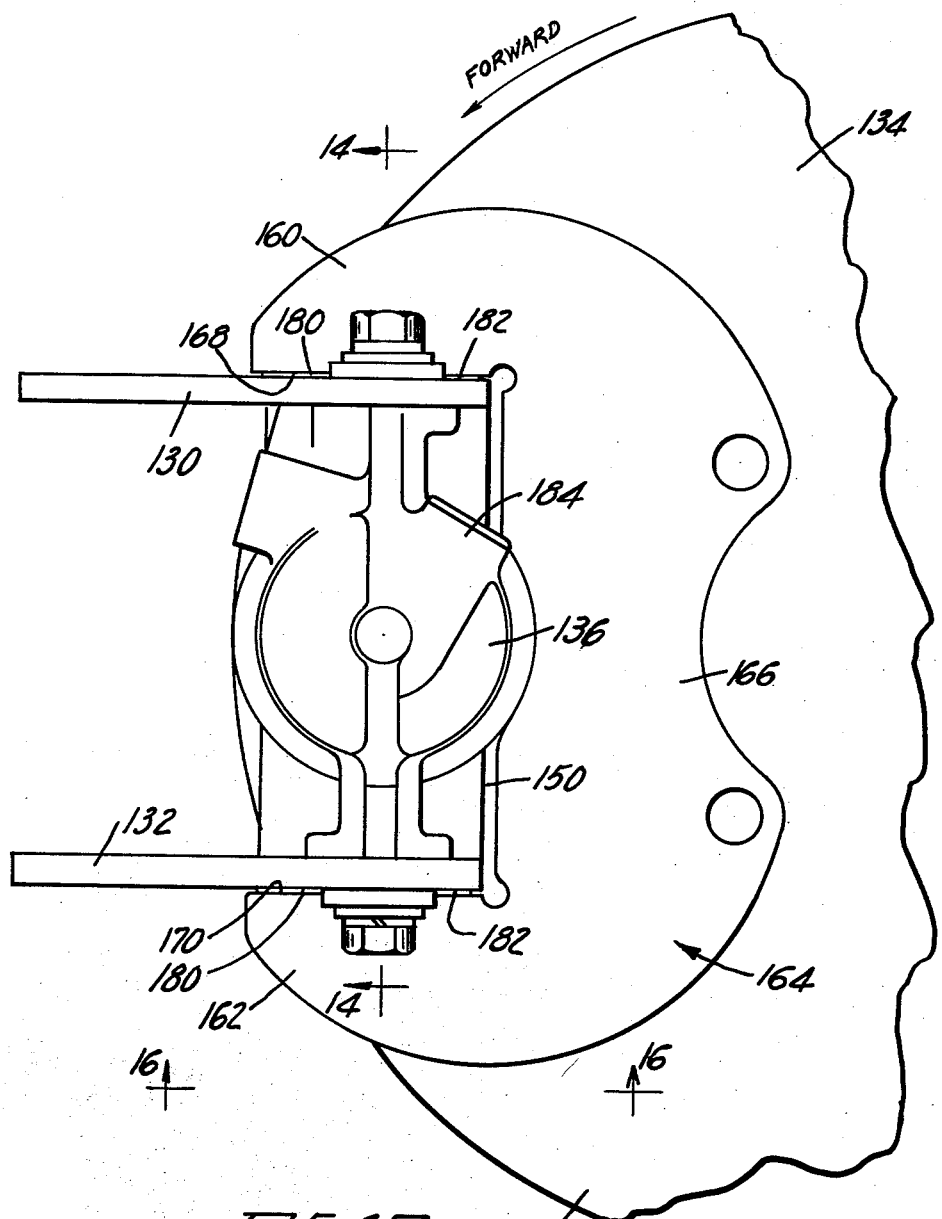

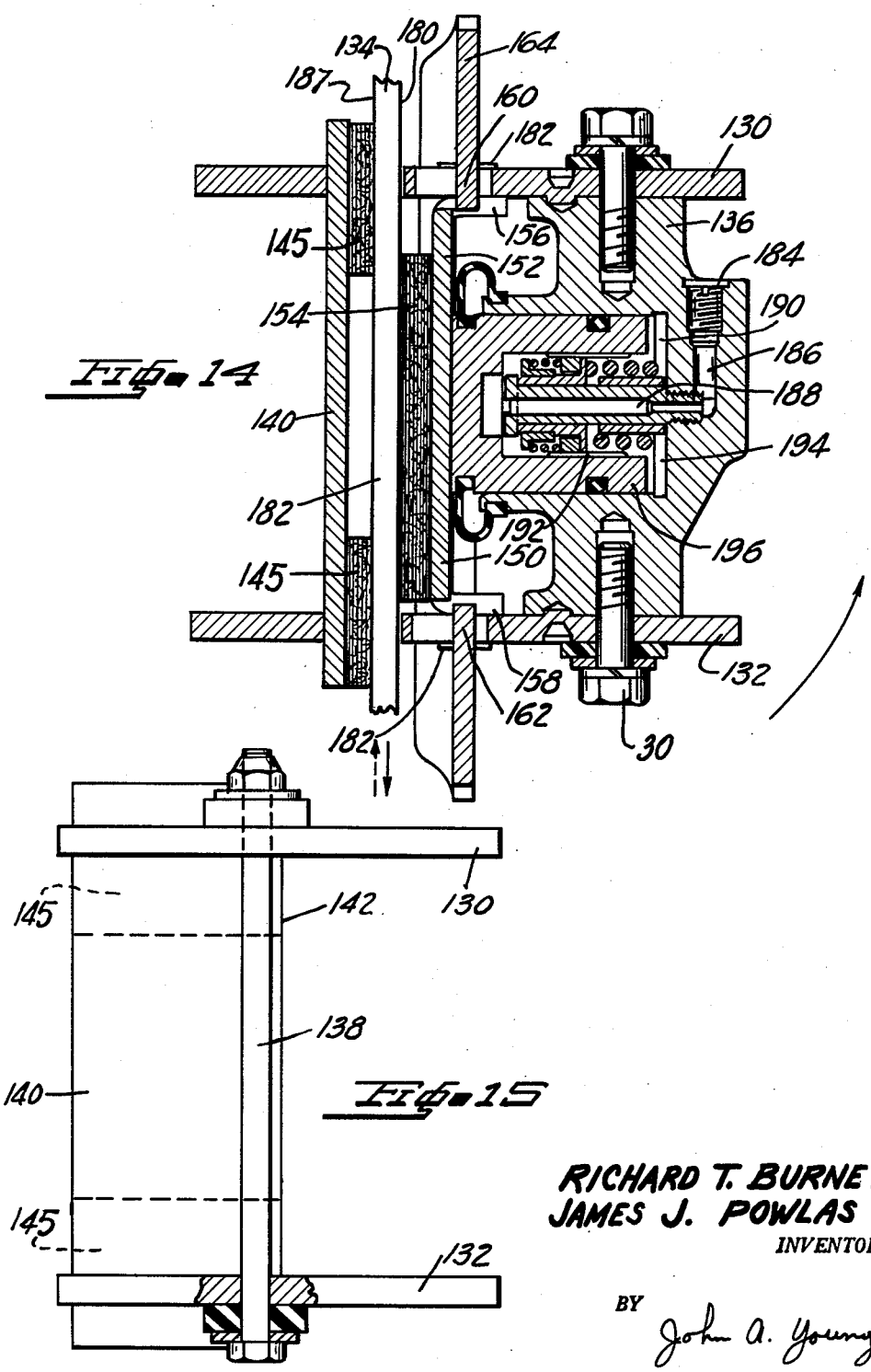

Jan. 19, 1965 R. T. BURNETT ETAL 3,166,156
CALIPER-TYPE DISC BRAKE
Filed Nov. 21, 1960 10 Sheets-Sheet 10
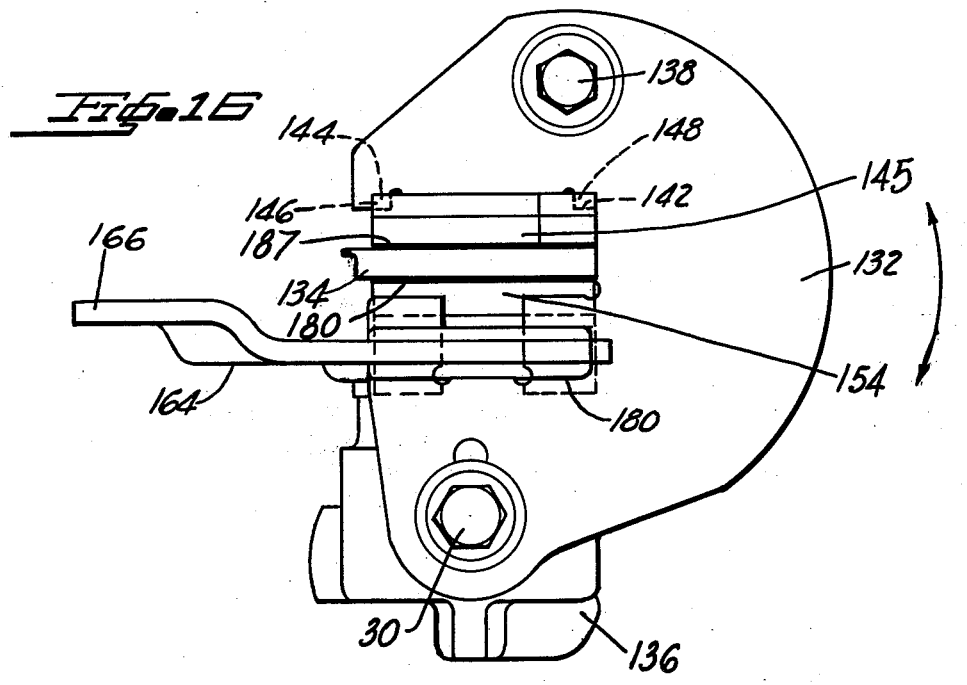
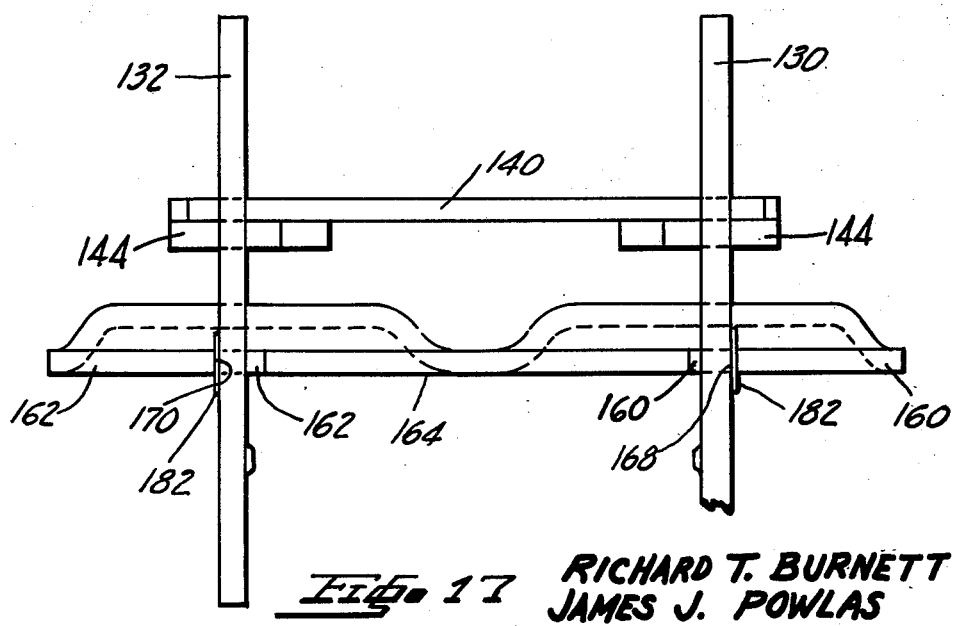
RICHARD T. BURNETT
JAMES J. POWLAS
INVENTORS
BY John A. Young
ATTORNEY

United States Patent Office 3,166,156
Patented Jan. 19, 1965

3,166,156
CALIPER-TYPE DISC BRAKE
Richard T. Burnett and James J. Powias, South Bend, Ind., assignors to The Bendix Corporation, South Bend, Ind., a corporation of Delaware
Filed Nov. 21, 1960, Ser. No. 70,640
9 Claims. (Cl. 188—73)

This invention relates to a brake and particularly to a vehicle brake of the passenger car type, it being understood that this is only one of the applications of the invention from which numerous other applications will suggest themselves to those skilled in the art and are intended to be included within the scope of the present invention.

The present invention is related to copending application Serial No. 63,894, filed October 20, 1960 in that it discloses a similar actuating principle and is also similar in the relationship of the nonrotatable part of the brake structure to the rotating part of the brake structure. The present invention is also related to previously filed application Serial No. 680,782, filed August 28, 1957, now U.S. Patent No. 3,035,664 which likewise discloses an organization of brake stator and brake rotor which is similar to the present invention.

One of the essential requisites of a vehicle brake, and particularly a passenger car brake, is that it must be noiseless in operation. Any evidence of brake noise during a brake application is apt to produce misapprehension on the part of the driver as to the proper functioning of the brake and furthermore the noise is itself an annoyance which passenger car operators will not tolerate.

It is one of the specific objects of the invention to provide a brake construction which is noiseless in operation i.e., when the friction members are engaged with the rotor there is no audible reaction from engagement or anchoring forces which are developed.

Another object of the invention is to provide an improved braking structure which is even more economical to produce than the previous related inventions disclosed in application Serial No. 63,894, filed October 20, 1960 and application Serial No. 680,782, now U.S. Patent No. 3,035,664 by providing a simpler brake supporting structure and further by simplifying the anchoring arrangement of the friction members.

A further object of the invention is to produce a disk brake construction embodying the usual functional advantages over the shoe type brake, but one which is as economical to produce as a shoe type brake and is of less weight thereby relieving some of the unsprung mass of the automobile and further contributing to economy of the manufacture of the brake.

Another object of the invention is to provide a disk type brake having a novel actuating and anchoring arrangement for the friction members, one of which is directly applied and the other of which is indirectly applied by a single fluid motor actuator, wherein the anchoring forces are distributed so as to cushion the anchoring load and preclude development of noise. This object is achieved at least in part by so mounting the friction members that they are free to move in two distinct planes both of which are transverse to the plane of the braking surfaces of the rotor so as to follow deflections of the rotor.

Another object of the invention is to provide a brake structure having the foregoing features and further capable of mechanical actuation so that the same brake members which are applied during service braking can also be actuated to effect parking braking for the vehicle.

These and other advantages which are in addition to the foregoing, will be apparent from the consideration of the following description which proceeds with reference to the accompanying drawings, wherein a plurality of embodiments of the invention are described by way of example.

In the drawings:

FIGURE 1 is a side elevation inboard side of the brake as it is installed on the right front vehicle wheel, with a portion of the rotor broken away;

FIGURE 2 is a section view taken on line 2—2 of FIGURE 1;

FIGURE 3 shows the outboard side of the brake or the side of the brake opposite that shown in FIGURE 1;

FIGURE 4 is an end view of the brake shown in FIGURE 1, looking in the direction of the arrows 4—4;

FIGURE 5 is a detail view of the brackets, mounting member, and outboard friction member looking in the direction of the arrows 5—5 in FIGURE 4, the rotor and fluid motor housing being shown removed;

FIGURE 7 is a side elevation of a brake embodiment showing how the brake structure of FIGURE 1 can be modified to provide for parking braking, this being generally provided at the rear wheels;

FIGURE 8 is a section view taken on line 8—8 of FIGURE 7;

FIGURE 9 is an end view of the brake looking in the direction of arrows 9—9 in FIGURE 8, a part of the end bracket being broken away to illustrate the actuating mechanism;

FIGURE 10 is a detail view of the actuating structure as it appears looking in the direction of the arrows 10—10 in FIGURE 9;

FIGURE 11 is a detail sectional view taken on line 11—11 of FIGURE 9;

FIGURE 12 is a detail view of the fluid motor actuator shown removed from its actuating position in FIGURE 7;

FIGURE 13 is a side elevation view taken at the inboard side of the brake at the right front wheel showing a further embodiment of the invention illustrating a different mounting and anchoring arrangement from that shown in the embodiments of FIGURES 1–12;

FIGURE 14 is a sectional view taken on line 14—14 in FIGURE 13;

FIGURE 15 illustrates the outboard side of the brake structure with the rotor removed;

FIGURE 16 is an end view of the brake structure looking in the direction of arrows 16—16 in FIGURE 13; and FIGURE 17 is a detail view of the brackets, mounting member and outboard friction member of the embodiment shown in FIGURE 13.

Figure 6:
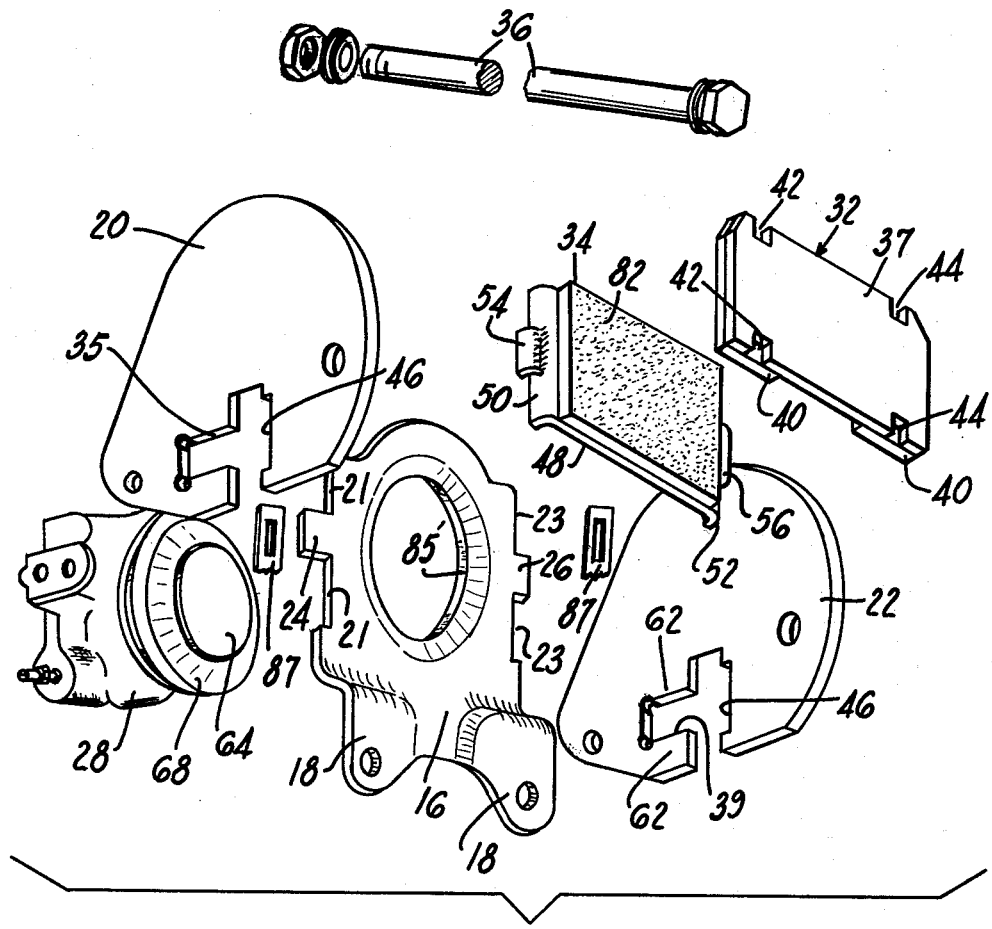
FIGURE 6 is an exploded isometric view of the brake assembly shown in FIGURES 1–5.

Referring now to the embodiments shown in FIGURES 1–6, there is illustrated a brake rotor 10 having annular, oppositely-facing braking surfaces 12 and 14 which make up the rotatable part of the brake structure. The rotor is fastened in some convenient manner at its radially inner portion to a rotatable part of the vehicle such as an axle flange (not shown).

The nonrotatable part of the brake structure comprises a mounting member 16 having at its radially inner ends 18 portions adapted for mounting on a fixed part of the brake such as an axle housing or the like (not shown). The mounting member provides two edge faces 21 and 23 which form anchoring surfaces for the brake.

There is mounted on member 16 a four sided cage structure which moves slidably on anchoring surfaces 21 and 23 but is prevented from rotating circumferentially by said surfaces 21 and 23, the cage being made up of: two spaced brackets 20, 22 which straddle the outer periphery of the rotor and are guided by engagement with lugs 24, 26 of the member 16; a fluid motor housing 28 having bolt connections 30 with the brackets 20, 22; and a friction member 32 which is fixed to the brackets at the outboard side of the brake together with a bolt 36 which fastens to the brackets 20, 22 through rubber washers or the like 38 that deaden vibration conducive to brake noise. The cage structure is free to move pivotally (FIGURE 4) on lugs 24, 26 in a plane transversely to the rotor 10 thereby enabling the friction members 32, 34 on each side of the rotor to conform with their opposed rotor surfaces. The described movement of the cage is permitted because the cross section of the lugs is narrow relative to the slots 35, 39 which are the supporting means between the cage and mounting member 16. This freedom of movement provided the friction members has a tendency to suppress noise, but just why this is the case we cannot state with certainty. Moreover, the cage is free to pivot in the plane and in the direction indicated by the arrows in FIGURE 2. In this instance the cage moves at one or the other of the anchoring edges 21 or 23 of the mounting member 16, also contributing to freedom of movement of the friction members 32, 34 so that they will conform to the opposing rotor surfaces in spite of deflections thereof. We have found that this greater freedom of movement has suppressed brake noise but the exact reasons are not fully explainable to our satisfaction.

The outboard friction member 32 comprises a backing 37 having spaced segments of friction material 38 and 40, the backing 37 being notched at 42 and 44 in its opposite ends so that it will fit within recesses 46 of the brackets 20, 22 and is retained therein against circumferential movement with the rotor.

The other friction member 34, which is at the inboard side of the brake includes a backing 48 having turned back flanges 50 and 52 at its opposite ends and additional flanges 54, 56 also located at the ends of the friction member to fit slidably within slots 35 and 39 of the brackets 20, 22 thereby guiding the friction member 34 in its lateral movement toward and away from the face 12 of the rotor 10. The flanges 50, 52 bear against the inner faces 60 and 62 of the brackets 20, 22 respectively transmitting the anchoring force of friction member 34 to one or the other bracket depending upon the direction of rotor rotation during braking operation.

Within the fluid motor housing 28 is a fluid pressure responsive piston 64 having an O-ring seal 66 and a rubber or the like sealing boot 68 which protects against entry of dirt within the fluid chamber 70. Also within the fluid motor housing is an automatic adjuster 72 which does not form a part of the present invention and is disclosed in detail and claimed in copending application Serial No. 63,894, filed October 20, 1960 previously filed by us. In brief, the automatic adjuster serves to locate the piston 64 more closely to the rotor as the friction segments become worn in order to maintain a proper running clearance in the brake between the friction members and the opposed rotor surfaces and also to effect retraction of the piston by a fixed amount following each brake application by a retracting spring 74. Details of the structure may be had by reference to the aforesaid Serial No. 63,894 filed October 20, 1960.

Novel provision is made for fluid inlet and bleeding of fluid from the housing 28. The novel inlet means comprises a port 76 connecting with passage 79, longitudinal passage 78 in stem 80 which terminates in chamber 81, there being a number of grooves 83 through which the fluid then passes to the power chamber 70 where it can be bled from bleeder port 85. This novel arrangement ensures complete removal of air from the actuator when the system is serviced.

In operation, the brake is applied by communicating fluid pressure to inlet 76 through passage 78 of the stem 80 and into chamber 70 thus effecting displacement of piston 64 toward the left (FIGURE 2) causing the friction member 34, which is in abutment with the end of the piston 64, to move toward the left thereby engaging friction material lining 82 with surface 12 of the rotor 10.

The piston extends through an opening 85' of the support member to be in direct engagement with the friction member 34. The fluid pressure simultaneously urges the housing 28 toward the right (FIGURE 2) thereby drawing the brackets 20, 22 toward the right which slide at notches 35, 39 on lugs 24, 26 of the mounting member 16. The bracket's movement as described draws friction member 32 toward the surface 14 of the rotor thereby engaging friction segments 40 against the surface 14 of the rotor 10. The segments 40 are disposed directly between the lugs of the brackets and surface 14 of the rotor to obtain maximum uniformity in lining wear.

The anchoring force of friction member 32 is transmitted to each of the brackets 20, 22 which tend to move circumferentially in the direction of rotation of the rotor 10. Thus, assuming that the brake is applied during forward vehicle movement corresponding to counterclockwise rotation of the rotor in FIGURE 1, (downwardly in FIGURE 2) the two brackets tend to move counterclockwise with the rotor 10 under the influence of the frictional forces of friction members 32, 34 or, referring to FIGURE 2 the brackets tend to move downwardly and the anchoring force is transmitted from the inner face 60 of bracket 20 to edge face 21 of the support member 16. The cage of the brake structure including the brackets 20, 22, housing 28 and friction member 32, is free to move axially and to turn angularly on lugs 24, 26 in both planes perpendicular to the surface 14 of the rotor thus enabling the friction member 32 to adjust itself to deflections of the rotor and "float" at the time of engagement with the rotor. The other friction member 34 which is directly applied by piston 64 is biased leftwardly (FIGURE 2) sliding at its opposite ends on flanges 50, 52 at their surfaces of engagement with brackets 20, 22. Because the flanges 54, 56 are engaged in slots 35, 39 the friction member 34 is prevented from turning, and assuming brake actuation with rotor movement as indicated by the arrow in FIGURE 2, the anchoring thrust of friction member 34 is transferred through flange 52 to bracket 22 which in turn transmits the anchoring load through housing 28 to bracket 20 which transfers the anchoring load to edge face 21 of the mounting member 16. It will be noted that whereas the anchoring force is taken initially on bracket 22 it is transmitted to the other bracket 20 so that ultimately the anchoring force is taken at the trailing end of the friction member 34. This is also believed to be a factor in reducing brake noise.

Where the brackets 20, 22 are clamped to the housing 28 there are included fiber washers or the like 84 and where bolt 36 fastens to the brackets 20, 22 there are also resilient rubber or the like washers 38 which also contribute to damping vibration thereby deadening brake noises. To further reduce brake noise there is a resilient spring 87 between each bracket 20, 22 and its anchoring surface 21, 23 of the mounting member 16 to cushion anchoring load and prevent rattles and similar brake noises.

From extensive testing of the brake shown in FIGURES 1–6, we have substantiated completely noise free brake operation without detracting in any way from the brake performance. Indeed, the various features which have been described as contributing to reduction in the noise level to a point where brake operation is inaudible also contributed to an even simpler brake construction which is easier to produce and very economical to provide as a commercial vehicle brake.

During reverse vehicle movement, i.e., clockwise rotation of the rotor in FIGURE 1, friction member 32 tends to move upwardly (FIGURE 2) when engaged with surface 14 of the rotor 10 and frictional force is transmitted to both brackets 20 and 22 by the friction member 32. When friction member 34 engages surface 12 of the rotor 10, it likewise tends to move upwardly anchoring through flange 50 on bracket 20 which transmits the anchoring force through housing 28 to bracket 22 bearing against anchoring edge face 23. Since the cage including brackets 20, 22, housing 28 and friction member 32 can turn slightly on lugs 24 and 26 (FIGURES 2 and 4) this permits the friction members 32, 34 to accommodate themselves to deflections of the rotor 10. It will be noted that the braking force is sustained at the trailing ends of the friction members 32 and 34 during reverse braking as well as during forward braking which is also a factor in suppression of brake noise.

Referring next to the embodiments shown in FIGURES 7–12 there is shown a brake construction adapted for use on the rear wheel brakes of the vehicle, incorporating a parking brake by which the friction members can be mechanically actuated as well as hydraulically. The essential difference between the embodiments of FIGURES 1–5 and 7–12 is the provision of a mechanical parking brake and such changes of the brake as are necessary to adapt the brake for inclusion of a mechanical actuator. Efforts have been made to keep the basic brake structure the same so that standardization of brake components will effect an economy in the manufacture.

The brake parts which are the same, as those in the previous embodiment, will be referred to by the same reference numerals and explanation will be limited essentially to the structural changes necessary for effecting parking brake operation. As in the previous embodiment, the two friction members 32 and 34 are biased against annular surfaces 12 and 14 of rotor 10. The two friction members 32 and 34 are anchored by two brackets, one of which 20 is of the same construction as in the previous embodiment and the other bracket 90 is considerably enlarged over bracket 22. The fluid motor housing 92 is constructed differently from the housing 28 in the previous embodiment and it includes a portion projecting through an opening 85' of support member 16 which is of the same construction as the previous embodiment and also includes the same pressure responsive piston 64 (together with an automatic adjuster 80) for directly biasing friction member 34 toward the left (FIGURE 8) and drawing the two brackets 20, 90 toward the right on their slidable connections with lugs 24 and 26 of the mounting member 16.

The housing 92 is secured by bolts 30 to brackets 20 and 90 through noise deadening fiber washers or the like 84 for each fastener 30. A mechanical actuator, designated generally by reference numeral 94, is essentially the same as that shown in our copending application Serial No. 63,894, filed October 20, 1960 but its description will be repeated for convenience to the extent necessary for understanding the operation of the mechanical actuator.

The first pair of outer levers 96 have openings 98 for connecting with a cable or the like which is pulled mechanically to apply the brakes. Levers 96 are fastened by pin 99 to a second pair of levers 100 which are mounted for pivotal movement on pin 102 and have rounded abutment surfaces 104 which contact shoulder 106 of pin 108 extending through an opening 110 of mounting member 16 to bear against friction member 34. Levers 100 have rounded abutment surfaces 112 to engage head 114 at the end of a threaded stem 116 which is slotted at 118 to provide for adjustment of the mechanical actuator. The mechanical actuator is further adjusted by means of a bolt 120 (FIGURES 9–10) which is threadedly mounted in a support member (not shown) and can be turned in one direction or the other for initial adjustment. In operation, the levers 96 are rotated counterclockwise about pin connection 99 which serves as a fulcrum so that pulling force is exerted through 114, this force being transmitted to housing 92 which, being connected to the brackets 20 and 90 urges the friction member 32 rightwardly (FIGURE 8) to engage the segments 40 thereof with surface 14 of the rotor 10 and once the friction member 32 is applied, the rounded abutment surfaces 112 act as a fulcrum point and force is transmitted through pin connection 99 to levers 100 causing them to rotate counterclockwise about 102 (FIGURE 9) exerting thrust through shoulder 106 on the pin 108 forcing the pin 108 leftwardly (FIGURE 8) to apply friction member 34 against surface 12 of the rotor 10. Levers 96 and 100 are periodically adjusted for wear by means of threaded stem 116, the threaded stem 116 being held against accidental turning by means of the set screw 122 which bears against the threaded stem 116 (FIGURE 11).

To hydraulically actuate the brake, fluid pressure is communicated through inlet port 76 to the pressure chamber 70, biasing piston 64 leftwardly (FIGURE 8) causing friction member 34 to slide relatively to the brackets and thereby applying friction member 34 against surface 12 of the rotor 10. The hydraulic reaction in chamber 70 forces housing 92 toward the right (still referring to FIGURE 8) thereby drawing the brackets 20 and 90 toward the right by slidably moving them on lugs 24 and 26 and drawing friction member 32 against surface 14 of the rotor 10. The two friction members anchor directly on the brackets and the brackets in turn, assuming rotation of the rotor indicated by the arrow in FIGURES 7 and 8, communicate the anchoring load to edge face 21 of the mounting member; and, in the opposite direction, the anchoring load of the friction members which is first exerted against the brackets is communicated to the support member 16 through edge face 23. Operation of the rear wheel brakes is substantially as noiseless as brake operation at the front wheel brakes and for the same reasons. That is, the cage including the two brackets 20 and 90 are free to turn slightly angularly on lugs 24 and 26 to accommodate for deflections of the rotor. Noise deadening connections are provided by washers 84 as in the previous embodiment; and resilient means 87 are disposed between the anchoring faces and the brackets 20, 22. Also, the friction member is anchored always at its trailing end, i.e., if the rotor is moving in the direction indicated by the arrow in FIGURE 8 the cage (including brackets 20, 22) is anchored on face 21 which is at the trailing end of both friction members; and conversely, when the rotor is traveling in the opposite direction and the brake is applied, the cage is anchored at face 23 which is at the trailing end of the friction members in the opposite direction of rotor rotation.

Referring next to the embodiment shown in FIGURES 13–17 we have modified the brake structure so that anchoring of the cage structure is at the leading end rather than at the trailing end of the friction members. Thus, referring to FIGURE 14, the two brackets 130 and 132 straddle the outer periphery of rotor 134 and are coupled together at one side by a fluid motor housing 136 and at the opposite side by the bolt 138. Friction member 140 is notched at the upper 142 and lower 144 edges at its opposite ends to receive projections 146 and 148 of the brackets 130, 132 thereby constraining the friction member 140 against circumferential movement. Friction member 150 comprises a backing 152 with the segment 154 of friction material and flanges 156 and 158 at its opposite ends bearing against brackets 130 and 132 and are slidable relatively to the brackets. The two brackets 130, 132 are received between projections 160 and 162 of the mounting member 164 which is adapted at its inner periphery 166 for mounting to a nonrotatable part of the vehicle such as an axle flange or the like (not shown).

The two projections 160 and 162 provide anchoring abutments 168 and 170 respectively against which the brackets 130 and 132 bear during brake operation. Between the abutments 168, 170 and the brackets 130, 132 are nearly flat cushioning springs 182.

The brake is applied by communicating fluid under pressure through inlet port 184 and passages 186 and 188 to chamber 190 and past grooves 192 to chamber 194 where the fluid pressure acts against piston 196 urging it leftwardly thereby applying friction member 150 against surface 180 of rotor 134. The friction member 150 slides at its flanges 156 and 158 on the brackets 130, 132 and when the friction lining 154 is engaged with surface 180, assuming rotation of the rotor counterclockwise in FIGURE 13 and in the direction of the full line arrow FIGURE 14, friction member 150 anchors at its lower flange 158 communicating the anchoring load to bracket 132 which anchors at anchoring surface 170 provided by projection 162 of mounting member 164. The hydraulic reaction force in chamber 194 urges housing 136 toward the right pulling brackets 130 and 132 therewith causing them to slide relatively to the support member 164 and urging friction member 140 also toward the right, applying its friction segments 145 against surface 187 of the rotor 134.

The anchoring load of the cage is sustained at surface 170 during braking with counterclockwise rotation of the rotor and at anchoring surface 168 in clockwise rotation of the rotor, this being in each instance at the leading end of the friction members rather than at the trailing end thereof as in the previous embodiments. The frictional force of engagement of the friction members with the rotor is communicated first to the brackets 130, 132 and since the brackets form part of the cage, thence to the support member 164 through one or the other of its anchoring surfaces 168 or 170.

When the anchoring load of the friction members is sustained at the leading end, as distinguished when the trailing end of the friction member, it is possible to locate the anchoring projections closer to the rotor thereby minimizing turning tendency of the brackets 130, 132 as indicated by the curved arrow in FIGURE 14. Because of the locations of points of engagement between the friction members and rotor surfaces is offset laterally from the anchoring point between the bracket and support member there is inevitably developed a certain amount of turning force indicated by the curved arrow in FIGURE 14 thus contributing to unevenness of wear of the friction limiting segments on the friction members and this can be minimized by sustaining the anchoring load from the cage as closely as possible to the support member. Another advantage of the present embodiment is that the two projections 160, 162 provide an open space therebetween for the actuating structure as indicated in FIGURE 13 so that the mounting member 164 need not be provided with an opening through which a portion of the fluid motor actuator extends. This simplifies construction of the mounting member 164 thereby obtaining a further reduction of cost of manufacture.

The same noise-deadening connections are provided in this embodiment as in the previous embodiments, namely, fiber washers and the like where the housing is secured to the brackets, and for the connection between bolt 138 and brackets 130, 132.

In all of the embodiments it will be noted that the friction member which is directly applied by the brackets has two spaced friction segments one between each bracket and the rotor. This arrangement minimizes distortion of the friction member and thereby reduces the displacement requirements for the fluid motor actuator to apply the brake.

While the present invention has been disclosed with only a certain selected number of embodiments, it will be understood that these are only illustrative of the invention and are in no sense restrictive thereof. It is reasonably expected, that those skilled in the art can make numerous modifications and revisions of the invention to suit individual design preferences, and it is intended therefore that such revisions and adaptations of the invention as incorporate the herein disclosed principles will be included within the scope of the following claims as equivalents of the invention.

What is claimed is:

1. A brake comprising a rotor having two annular braking surfaces one at each side of said rotor, a fixed support member located solely on one side of said rotor, said support member comprising circumferentially spaced generally flat plate portions generally parallel to said braking surfaces each having an edge defining an anchoring abutment surface, two circumferentially spaced brackets straddling the outer periphery of said rotor and providing anchoring abutment surfaces thereon disposed opposite of a respective one of said support member anchoring edges for engagement therewith, said brackets rocking on said anchoring abutment surfaces of said support member about an axis parallel to said braking surfaces, a slot in each of said brackets, said support member having a projection extending into a respective one of said slots, each of said slots being oversized relative to their respective projections to allow sliding movement of said brackets in a direction toward and away from said braking surfaces and rocking movement of said brackets about perpendicular axes generally parallel to the plane of said rotor friction faces, actuating means having spreadable members one of which is secured to said brackets for effecting lateral displacement thereof, and the other of which is displaceable in a brake applying direction toward one of said rotor braking surfaces, and two friction members one on each side of said rotor braking surfaces, one of said friction members being carried by said brackets and moveable thereby into engagement with the other of said rotor surfaces and the other of said friction members being located between said brackets and having sliding engagement surfaces with said brackets at its opposite ends, said other friction member being applied against said one rotor braking surface by the spreadable member of said actuating means which is displaceable in a brake applying direction towards said rotor.

2. The structure as recited in claim 1 wherein said other friction member is slidably carried by said brackets.

3. The structure as recited in claim 2 wherein said support member portion has a hole therein, said spreadable member displaceable in a brake applying direction being reciprocably slidable through said hole.

4. The structure as recited in claim 1 wherein said support member anchoring surfaces embrace the outer surfaces of said brackets, said anchoring abutment surfaces on said brackets being located on the outer surface of said brackets.

5. The structure as recited in claim 1 wherein said support member has guide means slidably receiving said other friction member.

6. In a brake: a rotor having friction surfaces thereon, a housing member straddling said rotor, actuating means mounted on said housing member, a fixed support member located solely on one side of said rotor, said housing member having circumferentially spaced anchoring surfaces, said support member comprising circumferentially spaced generally flat plate portions generally parallel to said friction surfaces each having an edge thereon defining an anchoring abutment surface disposed opposite a respective one of said housing anchoring surfaces for engagement therewith, said housing member rocking on said anchoring abutment surfaces about an axis parallel to said friction surfaces, a slot in each of said anchoring surfaces of one of said members, the other of said members having a projection extending from the anchoring surfaces thereof into a respective one of said slots, each of said slots being oversized relative to their respective projections to allow sliding movement of said housing in a direction toward and away from said rotor and rocking movement of said housing about generally perpendicular axes generally parallel to the plane of said friction surfaces.

7. In a disc brake: a rotor having friction surfaces thereon, a fixed support member located solely on one side of said rotor, a housing member straddling said rotor, actuating means mounted on said housing member, said support member comprising circumferentially spaced generally flat plate portions generally parallel to said friction surfaces each having an edge defining an anchoring abutment surface, said housing member having circumferentially spaced anchoring surfaces embracing said support member portions and being disposed opposite of a respective one of said anchoring surfaces of said support member for engagement therewith, said housing member rocking on said anchoring abutment surfaces about an axis parallel to said friction surfaces, a slot in each of said anchoring surfaces of one of said members, the other of said members having a projection extending from the anchoring surfaces thereof into a respective one of said slots, each of said slots being oversized relative to their respective projections to allow sliding movement of said housing in a direction toward and away from said rotor friction faces and for rocking movement of said housing about perpendicular axes generally parallel to the plane of said rotor friction faces.

8. In a disc brake, a rotor having friction surfaces thereon, a fixed support member located solely on one side of said rotor, a housing member straddling said rotor, actuating means mounted on said housing, said housing member having circumferentially spaced anchoring surfaces, said support member comprising circumferentially spaced generally flat plate portions generally parallel to said friction surfaces each having an edge defining an anchoring abutment surface, said plate portions embracing said housing and being disposed opposite of a respective one of said housing anchoring surfaces for engagement therewith, said housing member rocking on said anchoring abutment surfaces about an axis parallel to said friction surfaces, a slot in each of said anchoring surfaces of one of said members, the other of said members having a projection extending from the anchoring surfaces thereof into a respective one of said slots, each of said slots being oversized relative to their respective projections to allow sliding movement of said housing in a direction toward and away from said rotor friction faces and for rocking movement of said housing about perpendicular axes generally parallel to the plane of said rotor friction faces.

9. The structure as recited in claim 1 wherein said brackets embrace said support member anchoring edges, said anchoring surfaces on said brackets are disposed on the inner surfaces of said brackets, and said sliding engagement surfaces of said other friction member engages said anchoring abutment surfaces of said brackets.

References Cited in the file of this patent

UNITED STATES PATENTS

| 2,533,186 | Bricker et al. | Dec. 5, 1950 |
| 2,820,530 | Chouings et al. | Jan. 21, 1958 |
| 2,966,964 | Brueder | Jan. 3, 1961 |

FOREIGN PATENTS

| 145,332 | Australia | Feb. 21, 1952 |
| 1,227,386 | France | Mar. 7, 1960 |
| 711,405 | Great Britain | June 30, 1954 |
| 714,962 | Great Britain | Sept. 8, 1954 |
| 321,634 | Switzerland | June 29, 1957 |